No. 764,478. PATENTED JULY 5, 1904.
F. L. LEWIS.
GRAIN SEPARATOR.
APPLICATION FILED SEPT. 12, 1903.
NO MODEL. 2 SHEETS—SHEET 1.

Witnesses
Edwin F. McKee
Chas. S. Hyer

Inventor
Frank L. Lewis
By Victor J. Evans
Attorney

No. 764,478. PATENTED JULY 5, 1904.
F. L. LEWIS.
GRAIN SEPARATOR.
APPLICATION FILED SEPT. 12, 1903.
NO MODEL. 2 SHEETS—SHEET 2.

Witnesses
Edwin F. McKee
Chas. S. Hyer

Inventor
Frank L. Lewis
By Victor J. Evans
Attorney

No. 764,478. Patented July 5, 1904.

UNITED STATES PATENT OFFICE.

FRANK L. LEWIS, OF NECHE, NORTH DAKOTA.

GRAIN-SEPARATOR.

SPECIFICATION forming part of Letters Patent No. 764,478, dated July 5, 1904.

Application filed September 12, 1903. Serial No. 173,000. (No model.)

*To all whom it may concern:*

Be it known that I, FRANK L. LEWIS, a citizen of the United States, residing at Neche, in the county of Pembina and State of North Dakota, have invented new and useful Improvements in Grain-Separators, of which the following is a specification.

This invention relates particularly to that class of grain separators or selectors in which the grain is separated and graded according to its specific gravity and is dependent for its action upon the fact that when grain or similar particles are projected against air resistance or in a course across which a blast of air is blowing the particles or seed of higher specific gravity will travel farther than those of lower gravity. This produces a separation independent of size and enables the separation of seeds of the same size, but of different weights, which cannot be done by screen separation. This is particularly advantageous in the selection of grain for seed, where it is desirable that the heavier, sounder, and more fertile berries be secured.

The object of my invention is to produce an improved machine characterized by simplicity and cheapness for effecting the separation in the manner indicated. It embodies means for throwing or projecting the seed in an air-course and means, such as a fan, for blowing a blast across said course, which drops the lighter grain in advance of the heavier. The impact of the blades of the throwing-drum naturally knocks the sounder and heavier seeds farthest, and the blast assists the resulting separation.

The machine is illustrated in the accompanying drawings, in which—

Figure 1:
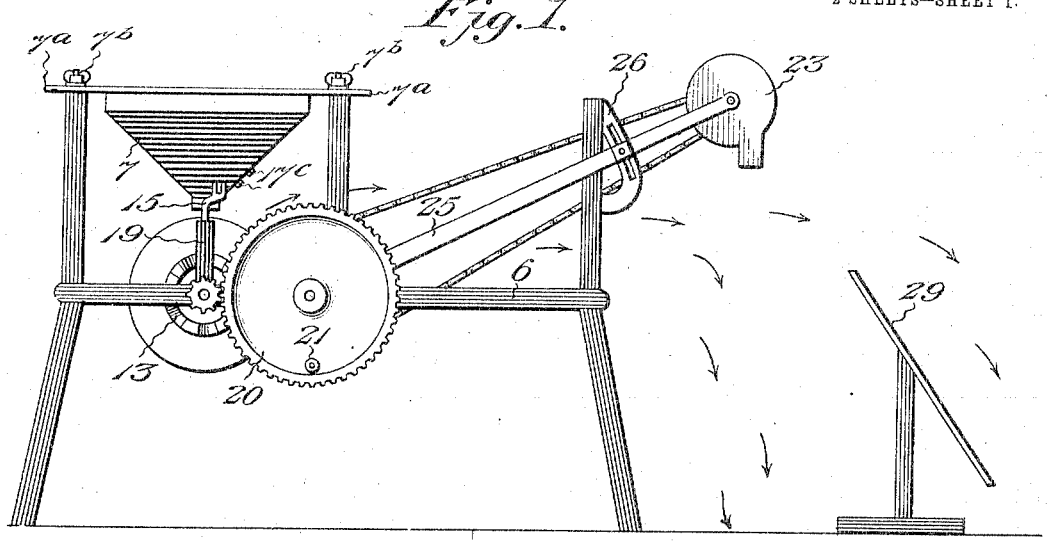
Figure 2:
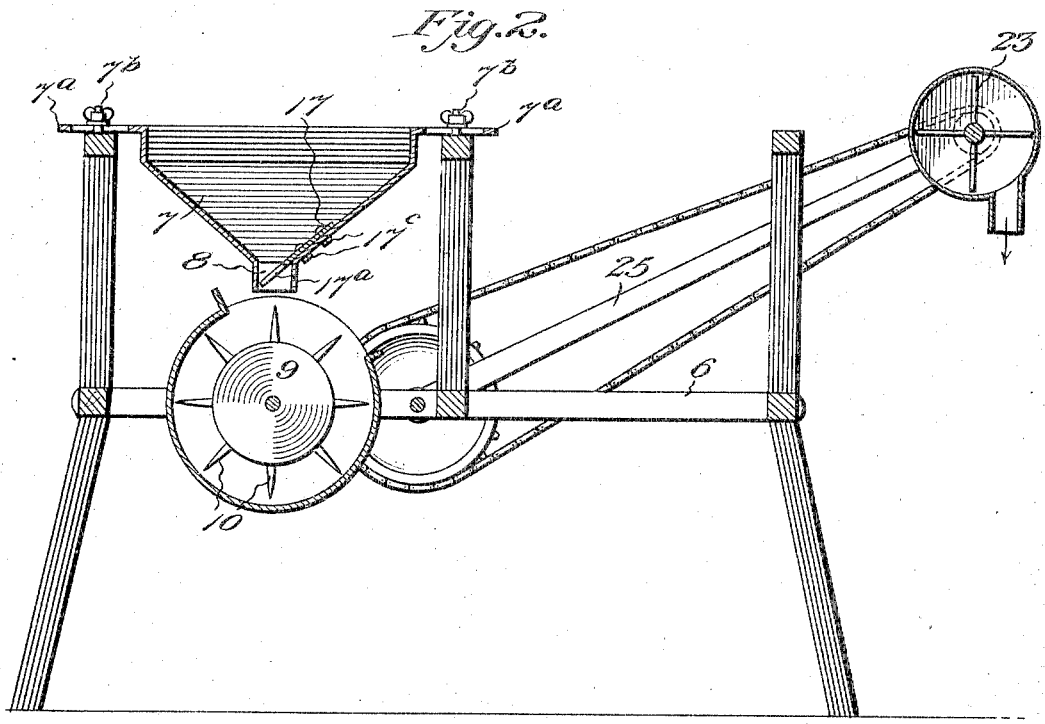
Figure 3:
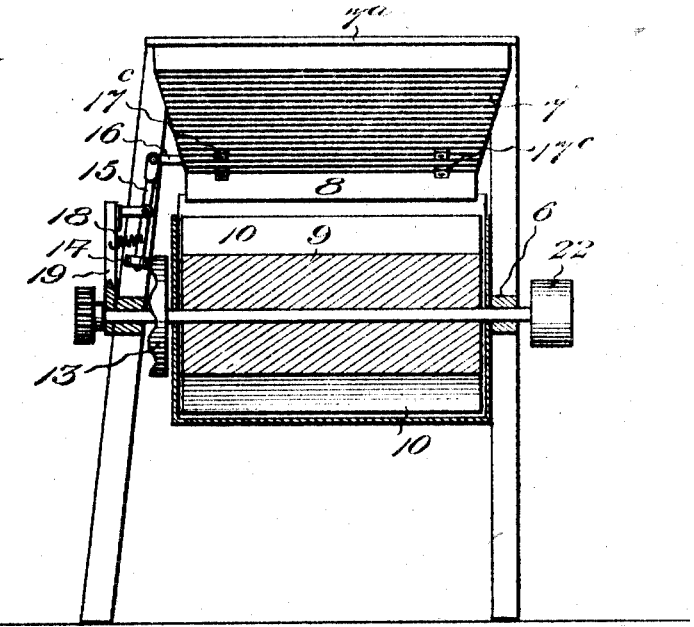
Figure 4:
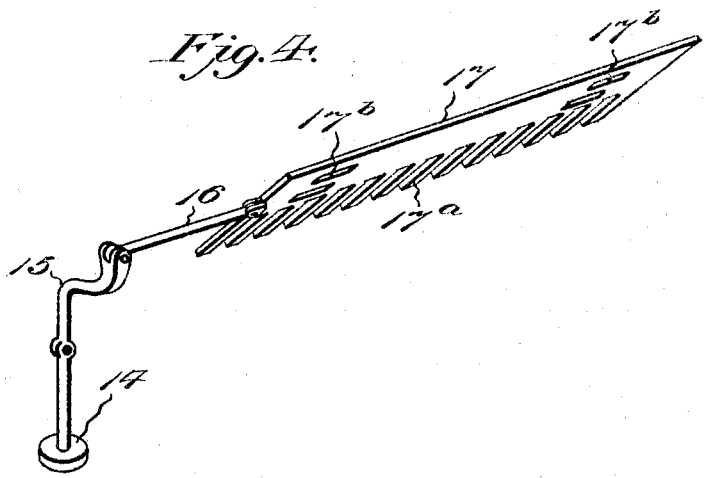

Figure 1 is a side elevation thereof. Fig. 2 is a vertical longitudinal section. Fig. 3 is a vertical cross-section. Fig. 4 is a perspective view of a slide to regulate the feed from the hopper.

Referring specifically to the drawings, 6 indicates the frame of the machine, supporting a hopper 7, from which the seed is fed through a slot 8 in the bottom thereof to a horizontal rotating drum 9 below. The drum carries parallel flights or blades 10, which extend lengthwise along the outer surface thereof, and said drum is inclosed in a cylindrical casing 11, which is open at the top to receive the grain from the hopper and for a distance down the side to permit the discharge or projection of the seed from the drum. The hopper is adjustably supported upon the frame by slotted arms $7^a$, permitting an adjustment of the hopper laterally to the axis of the drum, thereby varying the drop of grain toward the drum, and consequently the angle of the blades at time of impact, giving the desired angle of projection to the grain when thrown from the drum by the rotation thereof. The hopper is fixed at the adjustment mentioned by set-screws $7^b$, extending through the slots.

The shaft 12 of the drum is mounted in suitable bearings in the frame and carries a waved crown-wheel 13, whose face bears against a friction-roller 14 on one end of one arm of a lever 15, the other arm of which is connected by a rod 16 to the toothed equalizing and agitating plate 17, whose teeth $17^a$ work over the slot in the bottom of the hopper. Vibration of the lever produces reciprocating rectilinear motion of the plate, securing uniform feed of grain between the teeth along the whole length of the slot. The plate is slotted, as at $17^b$ to receive bolts $17^c$, whereby it is guided and held in place. To cushion the vibration of the lever and make it follow the waved wheel, a spring 18 is held in compression between the lever and the post 19.

The drum is driven through pinion $12^a$, fast on its shaft 12 and in mesh with the master-wheel 20, which carries a crank-handle 21 for hand operation. A pulley 22 is provided for a power drive, if desired.

At 23 a fan is indicated, placed at a suitable distance from the drum above and in line with the course of projection of grain therefrom, and the outlet 24 of the fan-casing is directed downwardly across the course of the grain. The fan is carried at the end of arms 25, which may be raised and lowered to vary the position of the fan with respect to the course of the grain, and said arms are held at adjustment by slot-and-bolt connection with a fixed support 26 on the frame. The fan is driven by a suitable chain belt 27 and sprocket 28 on the shaft $20^a$ of the drive-wheel 20.

At 29 a divider or cut-off board is indicated. This is of greater width than the machine to extend fully across the throw thereof and is adapted to be moved toward or from the machine, according to the fall of the grain, so that the heavier berries thereof will fall on the out or fan side of the board and the lighter berries on the inside.

In operation after the grain has been run through a cleaner to remove straw, rubbish, and the like it is fed through the hopper to the drum, the blades of which knock or throw the same, as indicated by the arrows in Fig. 1, in a course across which the blast from the fan blows, which blast naturally acting with greater effect on the lighter particles or berries retards the flight thereof, and they drop inside the board, while the heavier berries having greater force continue beyond the same. Variation in speed and in position of the fan, hopper, and board by the adjustments described produces an effective separation or selection of great nicety and a better result than with known suction or screen devices.

Having thus fully described the invention, what is claimed as new is—

In a grain-separator, the combination with a rotary drum having parallel longitudinal blades along its periphery which project the grain in an aerial course, of a hopper having a feeding-slot extending lengthwise above the drum, means to adjust the hopper sidewise with respect to the axis of the drum, and a vertically-adjustable fan blowing downwardly across said course.

In testimony whereof I affix my signature in presence of two witnesses.

FRANK L. LEWIS.

Witnesses:
F. P. HOLMES,
BENJ. FRYSLIE.